United States Patent
Pradella et al.

(10) Patent No.: US 7,947,348 B2
(45) Date of Patent: May 24, 2011

(54) POLYPROPYLENE COMPOSITIONS FOR STRETCHED ARTICLES

(75) Inventors: Fiorella Pradella, Mantova (IT); Pierre-Alain Weiss, Frankfurt am Main (DE); Claudio Cavalieri, Ferrara (IT); Gabriella Sartori, Ferrara (IT)

(73) Assignee: Basell Poliolefine Italia, s.r.l., Milan (IT)

( * ) Notice: Subject to any disclaimer, the term of this patent is extended or adjusted under 35 U.S.C. 154(b) by 470 days.

(21) Appl. No.: 12/086,348

(22) PCT Filed: Dec. 15, 2006

(86) PCT No.: PCT/EP2006/069772
§ 371 (c)(1),
(2), (4) Date: Jun. 11, 2008

(87) PCT Pub. No.: WO2007/071622
PCT Pub. Date: Jun. 28, 2007

(65) Prior Publication Data
US 2010/0233399 A1 Sep. 16, 2010

Related U.S. Application Data

(60) Provisional application No. 60/800,600, filed on May 16, 2006.

(30) Foreign Application Priority Data
Dec. 20, 2005 (EP) .................................. 05112456

(51) Int. Cl.
*B65B 53/00* (2006.01)
*F16B 4/00* (2006.01)
(52) U.S. Cl. ...... 428/34.9; 428/35.7; 428/516; 428/515; 525/240; 526/348.6
(58) Field of Classification Search .................. 428/516, 428/515, 34.9, 910, 35.7; 525/240, 348.1; 526/348.6
See application file for complete search history.

(56) References Cited

U.S. PATENT DOCUMENTS

| | | |
|---|---|---|
| 4,399,054 A | 8/1983 | Ferraris et al. |
| 5,095,153 A | 3/1992 | Agnes et al. |
| 5,556,920 A | 9/1996 | Tanaka et al. |
| 5,998,039 A | 12/1999 | Tanizaki et al. |
| 6,727,306 B2 | 4/2004 | Edwards et al. |
| 6,800,710 B2 | 10/2004 | Pelliconi et al. |
| 6,818,583 B1 | 11/2004 | Morini et al. |
| 6,825,309 B2 | 11/2004 | Morini et al. |
| 6,994,915 B2 | 2/2006 | Pelliconi et al. |
| 7,022,640 B2 | 4/2006 | Morini et al. |
| 7,049,377 B1 | 5/2006 | Morini et al. |
| 7,141,637 B2 | 11/2006 | Elder et al. |
| 7,169,871 B2 | 1/2007 | Morini et al. |
| 7,342,078 B2 | 3/2008 | Schottek et al. |
| 2003/0165703 A1 | 9/2003 | Pelliconi et al. |
| 2005/0032633 A1 | 2/2005 | Morini et al. |
| 2006/0020096 A1 | 1/2006 | Schottek et al. |
| 2006/0276607 A1 | 12/2006 | Ikenaga et al. |
| 2008/0152851 A1 | 6/2008 | McKeeman et al. |

FOREIGN PATENT DOCUMENTS

| | | |
|---|---|---|
| EP | 45977 | 2/1982 |
| EP | 361493 | 4/1990 |
| EP | 691366 | 1/1996 |
| EP | 728769 | 8/2006 |
| JP | 08-259749 | 10/1996 |
| WO | 00/63261 | 10/2000 |
| WO | 02/30998 | 4/2002 |
| WO | 02/051912 | 7/2002 |
| WO | 02/057342 | 7/2002 |
| WO | 03/045964 | 6/2003 |
| WO | 2004/056567 | 7/2004 |
| WO | 2006/018812 | 2/2006 |

*Primary Examiner* — Michael C Miggins
(74) *Attorney, Agent, or Firm* — Dilworth IP, LLC

(57) ABSTRACT

Polypropylene compositions, particularly suited for preparation of stretched/oriented articles, especially for injection stretch blow moulded bottles, comprising: A) one or more propylene homopolymers or propylene copolymers or their mixtures; B) from 500 to about 1500 ppm by weight of talc in form of particles having average particle diameter of equal to or less than 1.5 µm. Said compositions display higher crystallization temperature with respect to the same polyolefin (A) without addition of (B), while keeping good levels of transparency, particularly when (A) is or comprises a random polymer.

7 Claims, No Drawings

POLYPROPYLENE COMPOSITIONS FOR STRETCHED ARTICLES

The present invention relates to polypropylene compositions particularly suited for the preparation of articles wherein the said polypropylene compositions are oriented by stretching.

Such stretching is often referred to in the art as "solid state orientation", and is generally carried out by applying a traction or elongation force to the polymer material in at least one direction while the polymer is in the solid state, but at a temperature high enough to allow the polymer macromolecules to move and get consequently oriented in one or more directions.

Typical processes wherein stretching/orientation is carried out are those used for the preparation of oriented or bioriented polypropylene films (respectively OPP and BOPP), the tubular blown or double bubble processes for films, and the stretch blow molding processes, such as injection stretch blow molding, widely used for producing containers, in particular bottles.

In such applications the propylene homopolymers and copolymers are widely used due to their valuable balance of chemical, mechanical and optical properties. However it is often desirable, to improve their mechanical properties, to increase the crystallization temperatures of said polymers, in particular in the case of copolymers. Such effect is generally achieved by adding the so called "nucleating agents", examples of which are salts of monocarboxylic or polycarboxylic acids, e.g. sodium benzoate or aluminum tert-butylbenzoate, dibenzylidenesorbitol or its $C_1$-$C_8$-alkyl-substituted derivatives such as methyldibenzylidenesorbitol, ethyldibenzylidenesorbitol or dimethyldibenzylidenesorbitol or salts of diesters of phosphoric acid, e.g. sodium 2,2'-methylenebis(4,6,-di-tert-butylphenyl)phosphate and sodium 2,2'-ethylidene-bis(4,6-di-t-butylphenyl) phosphate. Particularly preferred are the dibenzylidenesorbitol derivatives.

However the dibenzylidenesorbitol derivatives, while very efficient as nucleating agents have several disadvantages. During the plasticization of the nucleated polymer a sufficiently high temperature is required for optimal dispersion of the nucleant in the polymer matrix. The nucleant is prone to degradation, especially if exposed to high temperatures. The nucleant and its degradation products can migrate to the surface of items formed out of the nucleated polymer. Due to such migration the nucleant and its degradation products can impact with succeeding surface treatments, like coating, printing, painting, etc. and also restrict the use of the plastic items in pharmaceutical applications. The prices of commercially available dibenzylidenesorbitol derivatives can be important and thus significantly increase the production costs for a nucleated polymer. Other nucleating agents generally cited in the patent and technical literature are inorganic additives such as talc, silica or kaolin. However these additives, and in particular talc, even if frequently cited in the literature while listing the possible nucleating agents, in practice are considered not to be suited for use in polypropylene stretched/oriented articles, because they badly affect the transparency. The decrease in transparency, when compared to an equivalent non-nucleated item, can be less evident before stretching, but it becomes particularly intense after stretching. Thus the use of the said inorganic additives for stretched articles is limited to very specific applications, like opaque cavitated films for breathable packaging.

According to U.S. Pat. No. 6,727,306, very low amounts (200 ppm or less) of inert particulate, like talc, are added to polyethylene terephthalate or polyolefins to be used in the preparation of bottles, in order to reduce the coefficient of friction. Higher amounts of the said particulate are excluded because, according to the teaching of the said document, they would reduce too much the transparency. It is also evident that no nucleating effect is considered to take place.

However it has now been found that a useful nucleating effect, with a meaningful increase of the crystallization temperature of the polymer material, is achieved by adding talc having a defined particle size in relatively low amounts, but sufficient to achieve the said nucleating effect, while maintaining the transparency of the stretched articles at satisfactory levels.

Thus the present invention provides polypropylene compositions comprising:

A) one or more propylene homopolymers or propylene copolymers or their mixtures;
B) from 500 to 1500 ppm by weight, preferably from 500 to 1000 ppm by weight of talc in form of particles having average particle diameter of equal to or less than 1.5 μm, preferably of equal to or less than 1 μm.

The propylene copolymer or copolymers that can constitute or be present in component (A) preferably contain one or more comonomers selected from ethylene and $C_4$-$C_{10}$ α-olefins, represented by the formula $CH_2$=CHR, wherein R is an alkyl radical, linear or branched, with 2-8 carbon atoms or an aryl (in particular phenyl) radical.

Examples of said $C_4$-$C_{10}$ α-olefins are 1-butene, 1-pentene, 1-hexene, 4-methyl-1-pentene and 1-octene. Particularly preferred are ethylene and 1-butene.

Preferably the compositions of the present invention present at least one melt peak, determined by way of DSC (Differential Scanning Calorimetry), at a temperature equal to or higher than 145° C.

Typically the compositions of the present invention have a crystallization temperature at least 1° C. higher, preferably at least 4° C. higher than the crystallization temperature of the polyolefin component (A) without addition of component (B).

Other preferred features for the compositions of the present invention are:
- Isotacticity index of the propylene (co)polymers of component (A): equal to or higher than 80%,
- amount of comomomer(s) in the copolymers in component (A) equal to or lower than 22% by weight, more preferably equal to or lower than 5% by weight, the lower limit being in particular of 0.3% by weight.
- total amount of comonomer(s) in component (A): 0.1 to 15% by weight.
- MFR L (Melt Flow Rate according to ISO 11133, condition L, i.e. 230° C. and 2.16 kg load) from 0.5 to 50, more preferably, in particular for the preparation of bottles and containers (stretch blow molding), from 1 to 40, most preferably from 5 to 25, for example from 9 to 13 g/10 min.;
- Polydispersity Index (PI): from 3 to 6, more preferably from 3 to 5;
- a Flexural Modulus of 500 MPa or higher, more preferably of 900 MPa or higher, most preferably of 1400 MPa or higher;
- Haze (on 1 mm injection moulded plaques): from 35% to 50%;
- fraction extractable in hexane (FDA 177, 1520): less than 5%, more preferably less than 3% by weight;
- fraction soluble in xylene at room temperature: less than 25%, more preferably less than 10%.

Preferred kinds of copolymers that can constitute or be present in component (A) are random copolymers containing such an amount of comonomer(s) as to have a melting temperature (measured by DSC) of 130° C. or higher, more preferably of 140° C. or higher. When only ethylene is present as the comonomer, it is generally within 0.8 and 6% by weight with respect to the weight of the polymer. When $C_4$-$C_{10}$ α-olefins are present, they are generally within 1 and 10% by weight with respect to the weight of the polymer. Propylene polymer compositions particularly suited for the preparation of stretch blow molded containers comprise:

$a^I$) 25 wt % to 75 wt %, preferably 35 wt % to 65 wt % of a homopolymer or minirandom copolymer of propylene containing up to 2.0 wt % of at least one of ethylene and $C_4$-$C_{10}$ α-olefins, having an isotactic index greater than 80%, preferably 90% to 99.5%; and $a^{II}$) 25 wt % to 75%, preferably 35 wt % to 65 wt % of a random copolymer of propylene and at least one olefin chosen from ethylene and $C_4$-$C_{10}$ α-olefins, containing 0.3 to 30 wt % of said olefin, preferably 0.3 to 20 wt %, more preferably 0.3 to 6% and having an isotactic index greater than 60%, preferably greater than 70%, more preferably equal to or greater than 80%;

wherein the overall propylene polymer composition preferably has a MFR of 1 to 50 g/10 min., more preferably 2 to 40 g/10 min.

In the said propylene polymer compositions the component $a^{II}$) is generally different in composition from component $a^I$). In particular, the amount of olefin(s) chosen from ethylene and $C_4$-$C_{10}$ α-olefins is preferably higher in $a^{II}$) than in $a^I$).

The expression "wt %" means percent by weight.

The propylene (co)polymers used for the component (A) in the compositions of the present invention belong to the family of the (co)polymers that can be obtained by way of polymerization processes in the presence of coordination catalysts. Said processes and the (co)polymers obtained from them are widely described in the art.

In particular it is possible to carry out the polymerization process in the presence of a Ziegler-Natta catalyst.

As is well known, the Ziegler-Natta polymerization catalysts comprise the reaction product of an organic compound of a metal of Groups I-III of the Periodic Table (for example, an aluminum alkyl), and an inorganic compound of a transition metal of Groups IV-VIII of the Periodic Table (for example, a titanium halide), preferably supported on a Mg halide. The polymerization conditions to be used with such catalysts generally are well known also.

For example one can use the high yield and highly stereospecific Ziegler-Natta catalysts and the polymerization processes described in U.S. Pat. No. 4,399,054, European patent 45977, European patent applications EP-A-361 493 and 728769, WO0063261, WO0230998, WO02057342 and WO02051912. Other suitable coordination catalysts that can be used in polymerization to prepare the propylene (co)polymers of component (A) of the compositions of the present invention are the metallocene catalysts.

The said polymerization catalysts comprise the reaction product of a metallocene and a compound such as an alumoxane, trialkyl aluminum or an ionic activator. A metallocene is a compound with at least one cyclopentadienyl moiety in combination with a transition metal of Groups IV-VIII of the Periodic Table.

For example one can use the metallocene catalysts described in WO 01/48034 and WO 03/045964.

When component (A) comprises a propylene polymer composition, the polymer material can be prepared by polymerizing the monomers in two or more consecutive or parallel stages. The polymerization can be carried out in any known manner in bulk, in suspension, in the gas phase or in a supercritical medium. It can be carried out batchwise or preferably continuously. Solution processes, suspension processes, stirred gas-phase processes or gas-phase fluidized-bed processes are possible. As solvents or suspension media, it is possible to use inert hydrocarbons, for example isobutane, or the monomers themselves. The above mentioned MFR values can be obtained directly in polymerization by adequately adjusting the molecular weight regulating agent (such as hydrogen, for example), or can be achieved by way of a visbreaking process to which the propylene (co)polymers are subjected.

The visbreaking process of the polymer chains is carried out by using the appropriate techniques. One of said techniques is based on the use of peroxides which are added to the (co)polymer in a quantity that allows one to obtain the desired degree of visbreaking. The peroxides that are most conveniently employable for the visbreaking process have a decomposition temperature preferably ranging from 150 to 250° C. Examples of said peroxides are the di-tert-butyl peroxide, the dicumyl peroxide, the 2,5-dimethyl-2,5-di(tert-butyl peroxy) hexyne, and the 2,5-dimethyl-2,5-di(tert-butyl peroxy)hexane, which is marketed under the Luperox 101 trade name.

The quantity of peroxide needed for the visbreaking process preferably ranges from 0.05% to 1% by weight of the (co)polymer.

Other additives used in the compositions of the present invention can include, but are not limited to phenolic antioxidants, phosphite-series additives, anti-static agents and acid scavengers, such as sodium stearate, calcium stearate and hydrotalcite. Tetrakis[methylene-3-(3',5'-di-t-4-hydroxyphenyl)propionate]methane and n-octadecinyl-3-(4'-hydroxynyl) propionate are particularly preferred as the phenolic antioxidants. When present, the content of the phenolic antioxidant can range from 0.001 to 2 parts by weight, preferably from 0.002 to 1.8 parts by weight, more preferably from 0.005 to 1.5 parts by weight. Tris(2,4-di-t-butylphenyl) phosphite is preferred as the phosphite additive. When present, the content of the phosphite can range from 0.001 to 1.5 parts by weight, preferably from 0.005 to 1.5 parts by weight, more preferably from 0.01 to 1.0 parts by weight. When present, the content of acid scavenger can range from 0.01 to 2 parts by weight, preferably from 0.02 to 1.5 parts by weight, more preferably from 0.03 to 1.5 parts by weight. All the said parts by weight are referred to 100 parts by weight of the total composition.

The talc used as component (B) in the compositions of the present invention is an ultra fine talc, characterized by the previously said values of average particle diameter.

As well known, talc is a mineral mainly composed of hydrated magnesium silicate, optionally associated with other mineral materials, such as chlorite (hydrated magnesium aluminum silicate) and dolomite.

To achieve the said values of average particle size, talc is milled with known techniques, for instance with air classified mills, compressed air, steam and impact grinding.

According to the present invention, the average particle diameter is the diameter value for which 50% by weight of the particles have a size smaller than said value. This size measure is also defined as D50. It is also frequent to define a D95 size measure, which is the diameter value for which 95% by weight of the particles have a size smaller than said value.

Preferably the component (B) of the compositions of the present invention has D95 of equal to or less than 3 μm. For non-spherical particles, the size generally consists of the equivalent spherical diameter (Stocks diameter). The measurement of D50 and D95 can be carried out by means of a "Sedigraph" apparatus, by gravity sedimentation.

The compositions of the present invention can be prepared by using known techniques starting from the polypropylene component (A) in form of pellets, or powders, or particles obtained from the polymerization process, that are preferably preblended in the solid state (with a Banbury, Henshel or Lodige mixer, for example) with the component (B), thus obtaining a dry blend which can be pelletized in an extruder using conventional techniques. It is also possible to feed the dry blend directly into the processing systems.

The stretched articles are prepared from the compositions of the present invention by using processing techniques well known in the art. As previously mentioned, preferred stretched articles according to the present invention are the oriented polypropylene films and containers, in particular bottles.

Oriented polypropylene film generally is made by various methods involving the solid state orientation. As previously mentioned, one such method is the tubular blown or double bubble method. Another is the tenter frame method.

In one embodiment of the tubular blown or double bubble method, the polypropylene composition is melt extruded through an annular die to form a molten tube which is brought into contact with an internal, cooling mandrel where it begins to solidify. The tube is further cooled in a water bath, and pulled through a pair of rolls which compress it tightly. After passing through the rolls, the cooled, solidified tube is "softened" by reheating with, for example, radiant heaters to a temperature below the melting point of the polypropylene, but high enough to enable the tube to be expanded by internal air pressure. The tube is insufflated by air under pressure. This causes the tube to enlarge and form a controlled bubble, thereby stretching the wall of the tube in all directions, and thereby biaxially orienting it. The bubble then is collapsed through frame rollers, between a pair of nib rolls, and passed through a slitter where the flattened bubble is slit into a strip or strips which is or are wound on a take-up reel or take-up reels.

In the tenter frame method the polypropylene composition is melt extruded through a slot die to form a molten sheet. The sheet is solidified by quench cooling onto a cast roll. In the on-line orientation practice of this method, the resulting cast sheet is immediately reheated to a temperature below the melting point of the polypropylene, but high enough to enable the composition to be drawn or stretched. In the case of sequential orientation, the thus "softened" cast sheet is drawn by rolls rotating at different speeds of rotation such that the sheet is stretched to the desired draw ratio in the longitudinal direction (machine direction). The thus uniaxially oriented sheet is subsequently clamped at its lateral edges by chain clips and conveyed into a tenter oven where it is again reheated to such a temperature, and drawn in the transverse direction to the desired draw ratio by means of the chain clips which are diverged in their forward travel. The resulting biaxially oriented film is released from the clips, edge-trimmed, and wound on a take-up reel.

The containers of the invention are produced by a process preferably including a first step of molding the propylene polymer composition, preferably at a temperature from 200° C. to 280° C. to form a preform. The temperature would be selected by those skilled in the art depending on the particular polymer composition involved. The first molding step can include injection molding, compression molding or blow molding. Injection molding is preferred. The second step of the process of the invention includes stretch blow molding the preform formed in the first step, preferably at a temperature from 100° C. to 160° C. Again, the stretch blow molding temperature would be selected by those skilled in the art depending on the polymer composition being molded. Both steps in the process can be performed in the same machine, as in the so-called single stage process. Alternately, preforms may be produced in a first piece of equipment, and subsequently routed to a second piece of equipment for stretch blow molding, as in the so-called two-stage process. In such a case, the preforms can be allowed to cool fully.

When required prior to the stretch blow molding step, the preforms are preferably heated in a heating oven. Infrared heating units are typically used, but one skilled in the art would recognize that any heat source consistent with the materials properties of the polymer based bottles may be used. When the preforms are heated prior to the stretch blow molding step in the two-stage process, the preforms are typically conveyed along a bank of heating units while being rotated to evenly distribute the heat. The bottles may also be contacted with cooling air during and after heating to minimize overheating of the preform surface. Once the heated preforms exit the heating oven, the preforms are transferred to a blow mold. A stretch rod is inserted into the preform to stretch the preform in the axial direction. Pressurized air at 1 to 40 bar, preferably 4 to 20 bar is introduced to complete the blow molding of the finished bottle. Optionally, the pressurized air can be introduced in two steps, where a pre-blow is performed by introducing pressurized air at 1 to 20 bar, preferably 4 to 12 bar, followed by the final blow molding at the higher pressures described above.

The following examples are given for illustrating but not limiting purposes.

The analytical methods used to determine the properties reported in the description and in the examples are identified and described below.

Comonomer content: By IR spectroscopy.

Melting and Crystallization temperatures: The melting temperature (Tm) and crystallization temperature (Tc) values are determined using the following procedure according to ISO 11357 Part 3.

Differential scanning calorimetric (DSC) data is obtained using a DSC Q1000 TA Instruments. Samples weighing approximately 6-8 mg are sealed in aluminum sample pans. The samples are subjected to a first heating run from 5° C. to 200° C. with a heating rate of 20° C./minute, and kept at 200° C. under isothermal conditions for 5 minutes. Then the samples are cooled from 200° C. to 5° C. (cooling run) with a cooling rate of 20° C./minute, and kept at 5° C. under isothermal conditions for 5 minutes, after which they are subjected to a second heating run from 5° C. to 200° C. with a heating rate of 20° C./minute. The Tm values are determined in the second heating run, while the Tc values are determined in the cooling run.

Melt Flow Rate ("MFR"): ASTM D1238, (230° C.; 2.16 kg).

Isotactic Index, ("I.I."): Defined as the percent of olefin polymer insoluble in xylene. The weight percent of olefin polymer soluble in xylene at room temperature is determined by adding 2.5 g of polymer in 250 ml of xylene at room temperature in a vessel equipped with a stirrer, and heating at 135° C. with agitation for 20 minutes to dissolve the polymer. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. These values correspond substantially to the isotactic index determined by extracting with boiling n-heptane, which by definition constitutes the isotactic index of polypropylene.

Polydispersity Index (PI): Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=105/Gc$$

in which Gc is the crossover modulus defined as the value (expressed in Pa) at which G'=G" wherein G' is the storage modulus and G" is the loss modulus.

Flexural Modulus: ISO178;

Izod notched (23° C.): ISO 180/1A;

Charpy notched (23° C.): ISO 179.

Haze (on 1 mm plaque and on film): According to the present method, 5×5 cm specimens are cut from moulded plaques 1 mm thick and from extruded and bi-oriented film. The haze value is measured using a Gardner photometric unit connected to a Hazemeter type UX-10 or an equivalent instrument having G.E. 1209 light source with filter "C". Reference samples of known haze are used for calibrating the instrument. The plaques to be tested are produced according to the following method. 75×75×1 mm plaques are molded with a GBF Plastiniector G235/90 Injection Molding Machine, 90 tons under the following processing conditions:

| | |
|---|---|
| Screw rotation speed: | 120 rpm |
| Back pressure: | 10 bar |
| Melt temperature: | 260° C. |
| Injection time: | 5 sec |
| Switch to hold pressure: | 50 bar |
| First stage hold pressure: | 30 bar |
| Second stage pressure: | 20 bar |
| Hold pressure profile: | First stage 5 sec |
| | Second stage 10 sec |
| Cooling time: | 20 sec |
| Mold water temperature: | 40° C. |

Haze on films is determined on films of the test composition, prepared as described below. The measurement is carried out on a 50×50 mm portion cut from the central zone of the film.

The instrument used for the test is a Gardner photometer with Haze-meter UX-10 equipped with a G.E. 1209 lamp and filter C. The instrument calibration is made by carrying out a measurement in the absence of the sample (0% Haze) and a measurement with intercepted light beam (100% Haze).

Fish eyes count: A 50 µm sample cast film is obtained on a Collin lab single screw extruder 30×25 D.

The film fish eyes density for each class (size) is then determined by analyzing a representative film amount through projection (projector Neo Solex 1000 with 1000 W lamp and objective Neo Solex F 300 or equivalent) on a standard white wall-chart which is set at a fixed distance from the projector and reports standard reading targets (the so called "sizing lines" or "gel classes"), or alternatively by using a secondary technique, i.e. an automatic optical scanning device (CCD camera based), to be calibrated and validated vs. the primary or "projector" procedure described above.

Yellow Index: ASTM E313-95.

Bottle Top Load @ Yield: ASTM D2659.

Haze on bottles: ASTM D1003.

Bottle Drop Impact: ASTM D2463 procedure B.

Processing Window

The processing window for the stretch-blowing of the bottles was determined using the processing conditions described below for the Applicative Examples Comp. 9, 13, 14, Comp. 10, Comp. 11, Comp. 12 and 15. Once the optimal settings had been selected, the infra-red radiation intensity was carefully reduced while recording the decreasing preform temperature at the oven exit. This temperature reduction was continued until the resulting bottles started showing processing defects. The lowest temperature recorded for a preform leading to a defect-free bottle was then noted as minimum processing temperature required. Then the infra-red radiation intensity was increased step-by-step while recording the rising preform temperature at the oven exit. This temperature rise was continued until the resulting bottles started showing processing defects. The highest temperature recorded for a preform leading to a defect-free bottle was then noted as maximum processing temperature required. Some typical processing defects were: burst preforms or bottles, off-centered bottle bases and very poor wall thickness distribution, flow marks and hazy spots on the bottle walls. The processing window was defined as the difference between the maximum and the minimum processing temperature.

Average Drop Height at 4° C.

The average drop height at 4° C. was determined using bottles produced with the processing conditions described below for the Applicative Examples Comp. 9, 13, 14, Comp. 10, Comp. 11, Comp. 12 and 15. For each Applicative Example six bottles were filled with 4° C. cold water and a conditioning time of 1 to 2 minutes was applied to allow the bottles to cool down. The bottles were then dropped on a tiled surface from a starting drop height of 10 cm. The bottles that did not burst were subsequently reused in a further drop test from a 10 cm higher drop height. This was repeated until all bottles bursted. For each bottle the last drop height passed was noted as an individual score for the respective bottle. The average of the individual scores of the six bottles from a same Applicative Example was then calculated to obtain an average drop height for each Applicative Example.

Average Drop Height at 20° C.

The average drop height at 20° C. was determined with the same procedure as described for the average drop height at 4° C., with the differences that water with a temperature of 20° C. was used, that the starting drop height applied measured 20 cm and that the bottles that did not burst were subsequently reused in a further drop test from a 20 cm higher drop height. The following materials were used in the examples.

Component (A)

1) PP-1: propylene polymer composition containing 55 wt % of a propylene homopolymer $a^I$) having an I.I. of 98 wt % and an MFR of 9.5 g/10 min., and 45 wt % of a propylene random copolymer $a^{II}$) having an ethylene content of 2.7 wt %, and an I.I. of 96 wt %. The total composition has an MFR of 9.0 g/10 min. and a molecular weight distribution of 4.3 (PI).

Such composition was prepared by first prepolymerizing with propylene a high-yield, high-stereospecificity Ziegler Natta catalyst supported on magnesium dichloride. The pre-polymerized catalyst and propylene were then continuously fed into a first loop reactor. The homopolymer formed in the first loop reactor and ethylene were fed to a second reactor. The temperature of both loop reactors was 72° C. The polymer was discharged from the second reactor, separated from the unreacted monomer and dried.

2) PP-2: propylene polymer composition, prepared with the same catalyst and polymerization process as for PP-1, containing 55 wt % of a propylene homopolymer $a^I$) having an I.I. of. 98 wt % and an MFR of 12 g/10 min., and 45 wt % of a propylene random copolymer $a^{II}$) having an ethylene content of 2.6 wt % and I.I. of 96 wt %. The total composition has an MFR of 11.4 g/10 min.

3) PP-3: propylene polymer composition, prepared with the same type of catalyst and polymerization process as for PP-1, containing 55 wt % of a propylene homopolymer $a^I$) having an I.I. of. 98.5 wt % and an MFR of 7 g/10 min., and 45 wt % of a propylene random copolymer $a^{II}$) having an ethylene content of 2.9 wt % and I.I. of 96 wt %. The total composition has an MFR of 12.8 g/10 min.

4) PP-4: propylene polymer composition, prepared with the same catalyst and polymerization process as for PP-1, containing 50 wt % of a propylene random copolymer $a^I$) having an ethylene content of 1.1 wt %, a MFR of 11.5 g/10 min. and an I.I. of. 98 wt %, and 50 wt % of a propylene random copolymer $a^{II}$) having an ethylene content of 2.1 wt %. The total composition has an MFR of 13 g/10 min. and an I.I. of 96.8 wt %.

5) PP-5: propylene copolymer having a butane-1 content of 5.1 wt %, a MFR of 9 g/10 min. and an I.I. of 97.6 wt %

Component (A) was compounded on a twin screw extruder to form pellets with 500 ppm of Irganox 1010, commercially available from Ciba Specialty Chemicals Corporation, 1000 ppm of Irgafos 168 commercially available from Ciba Specialty Chemicals Corporation, 400 ppm of calcium stearate or DHT-4A (synthetic hydrotalcite) commercially available from Kyowa Chemical Ind. Co. Ltd. In the examples according to the invention, also component (B) is added in the said compounding process, while in the comparative examples no component (B) is added.

The extruder's temperature depends on the melting temperatures of the polypropylene component (A) and it normally ranges from 190 to 250° C., preferably from 200 to 240° C. with a final melt temperature (die temperature) ranging from 210° C. to 260° C., preferably from 220° C. to 240° C.

Amounts of components and properties of the compositions obtained by compounding the same are reported in Table 1 below.

TABLE 1

| Example No. | | 1 | 2 | Comp. 1 | 3 | 4 | Comp. 2 |
|---|---|---|---|---|---|---|---|
| Component (A) | | PP-1 | PP-2 | PP-3 | PP-3 | PP-3 | PP-3 |
| Talc 1 (Component (B)) | ppm | 1000 | 1000 | — | 1000 | 1500 | 2000 |
| Acid scavenger | | DHT | DHT | CaSt | CaSt | CaSt | CaSt |
| Yellow Index | n | −0.1 | 0.4 | 1 | 1.5 | 1.7 | 1.7 |
| Haze 1 mm plaque | % | 43.4 | 46 | 56.6 | 46.4 | 46.8 | 48.1 |
| Tc | ° C. | 116.2 | 116.6 | 104.3 | 111 | 111.4 | 111.7 |
| Tm | ° C. | 157.5 | 158.5 | 158.2 | 159.1 | 158.1 | 159.2 |
| Flexural modulus | MPa | 1561 | 1588 | — | — | — | — |
| fish eyes 1.5-2.5 mm | n/m$^2$ | 0 | 0 | 0 | 0 | 0 | 0 |
| fish eyes 0.7-1.5 mm | n/m$^2$ | 0 | 0 | 0 | 0 | 0 | 0 |
| fish eyes 0.5-0.7 mm | n/m$^2$ | 5 | 3 | 5 | 11 | 0 | 0 |
| fish eyes >0.2 mm | n/m$^2$ | 70 | 40 | 270 | 200 | 400 | 500 |

Note:
CaSt = calcium stearate, DHT = synthetic hydrotalcite.

Component (B)

Talc 1: Jetfine 1 CA commercially available from Luzenac, having an average particle diameter (D50) of 0.7 μm and a D95 of 2.9 μm;

Talc 2 (comparative): talc HM2, commercially available from IMIFABI, having an average particle diameter (D50) of 2.4 μm.

EXAMPLES 1-4 AND COMPARATIVE EXAMPLES 1-2

Preparation of the Polypropylene Compositions

All the polypropylene compositions of the examples were prepared according to the following procedure.

EXAMPLES 5-7 AND COMPARATIVE EXAMPLES 3-6

Preparation of the Polypropylene Compositions

All the polypropylene compositions were prepared according to the procedure previously reported for Example 1. In all the examples, component (A) was compounded with 500 ppm of Irganox 1010, 1000 ppm of Irgafos 168 and 400 ppm of DHT-4A.

Amounts of components and properties of the compositions obtained by compounding the same are reported in Table 2 below.

TABLE 2

| Composition Example No. | | Comp. 3 | 5 | 6 | Comp. 4 | Comp. 5 | Comp. 6 | 7 |
|---|---|---|---|---|---|---|---|---|
| Component (A) | | PP-4 | PP-4 | PP-4 | PP-4 | PP-4 | PP-5 | PP-5 |
| Component (B) | | — | Talc-1 | Talc-1 | Talc-1 | Talc-2 | — | Talc-1 |
| Level of Component (B) | ppm | 0 | 1000 | 1500 | 2000 | 1000 | 0 | 1000 |
| Haze 1 mm plaque | % | 60.4 | 42.5 | 42.0 | 48.2 | 41.6 | 53.0 | 39.9 |
| Tc | ° C. | 103.3 | 109.0 | 109.5 | 111.8 | 111.0 | 105.5 | 107.1 |
| Tm | ° C. | 152.9 | 154.5 | 154.5 | 155.0 | 154.9 | 148.1 | 148.9 |
| Flexural modulus | MPa | 1305 | 1467 | 1480 | 1500 | 1505 | 1115 | 1206 |
| Izod notched (23° C.) | KJ/m$^2$ | 3.6 | 3.6 | 3.5 | 3.6 | 3.6 | 5.4 | 4.7 |
| Charpy notched (23° C.) | KJ/m$^2$ | 4.0 | 3.7 | 3.7 | 3.9 | 3.7 | 6.2 | 5.5 |

APPLICATIVE EXAMPLES 8-9 AND COMPARATIVE EXAMPLES 7-8

Preparation of Bioriented Films

75×75×2 mm plaques are molded with a GBF Plastiniector G235/90 Injection Molding Machine, 90 tons under the following processing conditions:

| | |
|---|---|
| Cooling water temperature: | 40° C. |
| Barrel temperature: | 220° C. |
| Melt temperature: | 230° C. |
| Die temperature: | 210° C. |
| Mold temperature: | 40° C. |
| Cooling time: | 20 sec. |

The said plaques were then are simultaneously stretched longitudinally and transversally, i.e. biaxially, by a factor 6 in both directions with a TM Long film stretcher at 150° C. with a stretch speed of 15000%/min., thus obtaining 50 µm thick films.

The haze values on the so obtained bioriented films are reported in Table 3.

TABLE 3

| Applicative Example No. | | Comp. 7 | 8 | 9 | Comp. 8 |
|---|---|---|---|---|---|
| Polypropylene composition of Ex. | | Comp. 1 | 3 | 4 | Comp. 2 |
| Haze on bioriented film | % | 1 | 1 | 1.3 | 1.5 |

The following Applicative Examples 10-12 relate to the preparation of injection stretch blow molded bottles. Preform molds and bottle molds with different and suited design are used to produce bottles with different weight and volumes.

APPLICATIVE EXAMPLE 10

The pellets of polypropylene composition prepared according to the above described Example 1 were injection molded into preforms at a set temperature of 230° C. using a reciprocating screw injection molding machine and a preform mold. The resultant preforms had a mass of 21.6 g. The preforms were then introduced into a multi cavity stretch blow molding machine in a time frame of 2 to 4 days after they were injection molded. The preforms were placed on a moving belt and the preforms were rotated. The rotating preforms passed in front of infra-red lamps, and preform temperatures were measured at the oven exit. Upon exiting the heating/conditioning area, the preforms were transferred to a blowing station. A blowing nozzle was inserted into the preform, guiding the stretching rod, which stretched the preform in the axial direction. There was a pre-blow pressure of 5 bar to avoid a contact between the preform and the stretching rod during the axial stretching and to start the radial stretching. This was followed by high pressure blowing at 11 bar to finish the blowing into a bottle mold. Bottles were produced at a fixed production rate of 1400 bottles per hour per cavity. Oven settings were adjusted to produce bottles with optimized distribution of the material thickness in the bottle wall and optimal clarity. The resulting bottles had a brimful volume of 523 ml.

APPLICATIVE EXAMPLE 11

The pellets of polypropylene composition prepared according to the above described Example 1 were injection molded into preforms at a set temperature of 260° C. using a reciprocating screw injection molding machine and using a preform mold. The resultant preforms had a mass of 16.3 g. The preforms were then introduced into a single cavity laboratory stretch blow molding machine in a time frame of 42 to 44 days after they were injection molded. The preforms were placed on a moving and rotating spindle. The rotating preforms passed in front of infra-red lamps, and preform temperatures were measured at the oven exit. Upon exiting the heating/conditioning area, the preforms were transferred to a blowing station. A blowing nozzle was inserted into the preform, guiding the stretching rod, which stretched the preform in the axial direction. There was a pre-blow pressure of 3 bar to avoid a contact between the preform and the stretching rod during the axial stretching and to start the radial stretching. This was followed by high pressure blowing at 3 bar to finish the blowing into a bottle mold. Oven settings and cycle time were adjusted to produce bottles with optimized distribution of the material thickness in the bottle wall and optimal clarity. The resulting bottles had a brimful volume of 520 ml.

APPLICATIVE EXAMPLE 12

The pellets of polypropylene composition prepared according to the above described Example 2 were injection molded into preforms at a set temperature of 230° C. using a reciprocating screw injection molding machine and using a preform mold. The resultant preforms had a mass of 16.8 g. The preforms were then introduced into a single cavity laboratory stretch blow molding machine in a time frame of 4-6 days after they were injection molded. The preforms were placed on a moving and rotating spindle. The rotating preforms passed in front of infra-red lamps, and preform temperatures were measured at the oven exit. Upon exiting the heating/conditioning area, the preforms were transferred to a blowing station. A blowing nozzle was inserted into the preform, guiding the stretching rod, which stretched the preform in the axial direction. There was a pre-blow pressure of 12 bar to avoid a contact between the preform and the stretching rod during the axial stretching and to start the radial stretching. This was followed by high pressure blowing at 12 bar to finish the blowing into a bottle mold. Bottles were produced at a fixed production rate of 1000 bottles per hour per cavity. Oven settings were adjusted to produce bottles with optimized distribution of the material thickness in the bottle wall and optimal clarity. The resulting bottles had a brimful volume of 510 ml.

Table 4 summarizes the bottle properties of Applicative Examples 10-12.

TABLE 4

|  | Example No. | | |
|---|---|---|---|
|  | 10 | 11 | 12 |
| Polypropylene composition of Ex. | 1 | 1 | 2 |
| Bottle weight, g | 21.6 | 16.3 | 16.8 |
| Bottle brimful volume, ml | 523 | 520 | 510 |
| Haze, % | 4.2 | 4.3 | 3.6 |
| Top Load @ Yield, N | 161 | 122 | 117 |

APPLICATIVE EXAMPLES 13-15 AND COMPARATIVE EXAMPLES 9-12

The pellets of polypropylene composition prepared according to the above described Examples Comp. 3, 5, 6, Comp. 4, Comp. 5, Comp. 6 and 7 were injection molded into preforms at a set temperature of 240° C. using a reciprocating screw injection molding machine and using a preform mold. The resultant preforms had a mass in the range of 16.6 to 16.7 g depending on the composition. The preforms were then introduced into a single cavity laboratory stretch blow molding machine in a time frame of ca. 14 days after they were injection molded. The preforms were placed on a moving and rotating spindle. The rotating preforms passed in front of infra-red lamps, and preform temperatures were measured at the oven exit. Upon exiting the heating/conditioning area, the preforms were transferred to a blowing station. A blowing nozzle was inserted into the preform, guiding the stretching rod, which stretched the preform in the axial direction. There was a pre-blow pressure of 10 bar to avoid a contact between the preform and the stretching rod during the axial stretching and to start the radial stretching. This was followed by high pressure blowing at 24 bar to finish the blowing into a bottle mold. Bottles were produced at a fixed production rate of 1000 bottles per hour per cavity. Oven settings were adjusted to produce bottles with optimized radial distribution of the material thickness in the bottle wall and optimal clarity. The axial distribution of material thickness was optimized by determining the masses of four defined bottle sections and adjusting the heating profile of the infra-red lamps to obtain similar section masses from one Applicative Example to the next. The resulting bottles had a brimful volume in the range of 505 to 510 ml depending on the composition.

Table 5 summarizes the bottle properties.

TABLE 5

| Applicative Example No. | | Comp. 9 | 13 | 14 | Comp. 10 | Comp. 11 | Comp. 12 | 15 |
|---|---|---|---|---|---|---|---|---|
| Polypropylene composition of Ex. | | Comp. 3 | 5 | 6 | Comp. 4 | Comp. 5 | Comp. 6 | 7 |
| Bottle mass | g | 16.67 | 16.68 | 16.68 | 16.69 | 16.67 | 16.60 | 16.62 |
| Bottle brimful volume | ml | 505 | 508 | 507 | 507 | 508 | 508 | 510 |
| Processing window | ° C. | 10.9 | 11 | 9.4 | 9.5 | 10.7 | 10.5 | 10.6 |
| Top load | N | 96 | 84 | 81 | 78 | 78 | 72 | 78 |
| Average drop height at 4° C. | cm | 3.3 | 10.0 | 1.7 | 3.3 | 3.3 | 0.0 | 6.7 |
| Average drop height at 20° C. | cm | 16.7 | 33.3 | 20.0 | 20.0 | 30.0 | 20.0 | 40.0 |
| Bottle haze | % | 8.7 | 9.0 | 10.5 | 12.9 | 12.9 | 3.1 | 7.6 |

The invention claimed is:

1. A polypropylene composition comprising:
   A) a polymer comprising:
   $a^I$) 25 wt % to 75 wt % of a homopolymer of propylene, or a minirandom copolymer of propylene comprising up to 2.0 wt % of at least one comonomer selected from ethylene, $C_4$-$C_{10}$ α-olefin, and mixtures thereof, wherein the homopolymer of propylene or minirandom copolymer of propylene comprise an isotactic index greater than 80%; and
   $a^{II}$) 25 wt % to 75 wt % of a random copolymer of propylene, and at least one olefin selected from ethylene, $C_4$-$C_{10}$ α-olefins, wherein the random copolymer of propylene comprises 0.3 to 30 wt % of the olefin, and the random copolymer of propylene comprises an isotactic index greater than 60%; and
   B) from 500 to 1500 ppm by weight of talc particles comprising an average particle diameter of equal to or less than 1.5 µm.

2. The polypropylene composition of claim 1 further comprising a MFR value from 0.5 to 50 g/10 min.

3. A stretched article comprising a polypropylene composition comprising:
   A) a polymer comprising:
   $a^I$) 25 wt % to 75 wt % of a homopolymer of propylene, or a minirandom copolymer of propylene comprising up to 2.0 wt % of at least one comonomer selected from ethylene, $C_4$-$C_{10}$ α-olefin and mixtures thereof, wherein the homopolymer of propylene or minirandom copolymer of propylene comprise an isotactic index greater than 80%; and
   $a^{II}$) 25 wt % to 75 wt % of a random copolymer of propylene, and at least one olefin selected from ethylene and $C_4$-$C_{10}$ α-olefins, wherein the random copolymer of propylene comprises 0.3 to 30 wt % of the olefin, and the random copolymer of propylene comprises an isotactic index neater than 60%; and
   B) from 500 to 1500 ppm by weight of talc particles comprising an average particle diameter of equal to or less than 1.5 µm.

4. The stretched article of claim 3 wherein polymer $a^I$ is a propylene homopolymer and polymer $a^{II}$ is a copolymer of propylene and ethylene.

5. The stretched article of claim 4 wherein components A) and B) are produced with a Ziegler-Natta catalyst.

6. An oriented film comprising a stretched article comprising a polypropylene composition comprising:
A) a polymer comprising:
  $a^I$) 25 wt % to 75 wt % of a homopolymer of propylene, or a minirandom copolymer of propylene comprising up to 2.0 wt % of at least one comonomer selected from ethylene, $C_4$-$C_{10}$ α-olefin, and mixtures thereof, wherein the homopolymer of propylene or minirandom copolymer of propylene comprise an isotactic index greater than 80%; and
  $a^{II}$) 25 wt % to 75 wt % of a random copolymer of propylene, and at least one olefin selected from ethylene, $C_4$-$C_{10}$ α-olefins, wherein the random copolymer of propylene comprises 0.3 to 30 wt % of the olefin, and the random copolymer of propylene comprises an isotactic index greater than 60%; and
B) from 500 to 1500 ppm by weight of talc particles comprising an average particle diameter of equal to or less than 1.5 μm.

7. A blow molded container or bottle comprising a stretched article comprising a polypropylene composition comprising:
A) a polymer comprising:
  $a^I$) 25 wt % to 75 wt % of a homopolymer of propylene, or a minirandom copolymer of propylene comprising up to 2.0 wt % of at least one comonomer selected from ethylene, $C_4$-$C_{10}$ α-olefin, and mixtures thereof, wherein the homopolymer of propylene or minirandom copolymer of propylene comprise an isotactic index greater than 80%; and
  $a^{II}$) 25 wt % to 75 wt % of a random copolymer of propylene and at least one olefin selected from ethylene and $C_4$-$C_{10}$ α-olefins, wherein the random copolymer of propylene comprises 0.3 to 30 wt % of the olefin, and the random copolymer of propylene comprises an isotactic index greater than 60%; and
B) from 500 to 1500 ppm by weight of talc particles comprising an average particle diameter of equal to or less than 1.5 μm.

* * * * *